United States Patent
Bichler

(10) Patent No.: US 9,823,556 B2
(45) Date of Patent: Nov. 21, 2017

(54) LIGHT MODULE AND METHOD FOR PROVIDING WAVELENGTH-CONVERTED LIGHT IN THE RED SPECTRAL RANGE AND PROJECTION DEVICE THEREFOR

(71) Applicant: OSRAM GmbH, Munich (DE)

(72) Inventor: Daniel Bichler, Munich (DE)

(73) Assignee: OSRAM GmbH, Munich (DE)

(*) Notice: Subject to any disclaimer, the term of this patent is extended or adjusted under 35 U.S.C. 154(b) by 152 days.

(21) Appl. No.: 14/972,254

(22) Filed: Dec. 17, 2015

(65) Prior Publication Data

US 2016/0178141 A1  Jun. 23, 2016

(30) Foreign Application Priority Data

Dec. 19, 2014 (DE) .......... 10 2014 226 591

(51) Int. Cl.

| | |
|---|---|
| *G03B 21/14* | (2006.01) |
| *F21K 99/00* | (2016.01) |
| *F21V 9/00* | (2015.01) |
| *F21V 9/16* | (2006.01) |
| *G03B 21/20* | (2006.01) |
| *F21S 10/02* | (2006.01) |
| *G03B 33/08* | (2006.01) |

(52) U.S. Cl.
CPC .......... *G03B 21/204* (2013.01); *F21S 10/02* (2013.01); *G03B 33/08* (2013.01)

(58) Field of Classification Search
CPC .. G04N 9/3114; G04N 9/3117; G03B 21/204; G03B 21/006; G03B 21/005; F21S 10/02; G02B 26/008
See application file for complete search history.

(56) References Cited

U.S. PATENT DOCUMENTS

| | | | | |
|---|---|---|---|---|
| 9,175,829 B2* | 11/2015 | Mehl | .......... | F21V 9/08 |
| 9,562,671 B2* | 2/2017 | Davis | .......... | F21V 7/22 |
| 2015/0252963 A1* | 9/2015 | Stoll | .......... | H01L 33/504 |
| | | | | 362/293 |

* cited by examiner

*Primary Examiner* — William C Dowling
(74) *Attorney, Agent, or Firm* — Viering, Jentschura & Partner mbB

(57) ABSTRACT

A light module may include a conversion means, which is designed to absorb excitation radiation having a first wavelength of an absorption spectrum and to convert it into light having a second wavelength of an emission spectrum. The light module includes an excitation radiation source designed to emit excitation radiation. The excitation radiation source is arranged in such a way that emitted excitation radiation can be radiated at least indirectly onto the conversion means. The light module includes a spectral filter having a long-pass filter characteristic and having a limiting wavelength. The spectral filter is designed and arranged to reduce the emission spectrum having the second dominant wavelength to the output spectrum having the first dominant wavelength. The conversion means has an emission spectrum having a red spectral component and having a second dominant wavelength and having a full width at half maximum of at least 120 nm.

19 Claims, 9 Drawing Sheets

| | | $\lambda_{filter}$ | $\lambda_{dom,filtered}$ | $E_{filtered}/E_{unfiltered}$ | $\phi_V/\phi_{V,YAG}$ |
|---|---|---|---|---|---|
| 48 → | YAG:Ce | 589 nm | 604 nm | 35% | 100% |
| 49 → | $CaLu_{1.94}Ce_{0.06}Mg_2Si_3O_{12}$ | 584 nm | 604 nm | 68% | 148% |
| 50 → | $CaLu_{1.8}Ce_{0.2}Mg_2Si_3O_{12}$ | 583 nm | 604 nm | 74% | 154% |
| 51 → | $Ca_2Lu_{0.97}Ce_{0.03}Mg_2Si_3O_{12}$ | 587 nm | 604 nm | 46% | 114% |

Fig.8

| | $\lambda_{filter}$ | $\lambda_{dom,filtered}$ | $E_{filtered}/E_{unfiltered}$ | $\phi_V/\phi_{V,YAG}$ |
|---|---|---|---|---|
| 57 → YAG:Ce | 590 nm | 605 nm | 34% | 100% |
| 58 → CaLu$_{1.94}$Ce$_{0.06}$Mg$_2$Si$_3$O$_{12}$ | 590 nm | 608 nm | 64% | 127% |
| 59 → CaLu$_{1.8}$Ce$_{0.2}$Mg$_2$Si$_3$O$_{12}$ | 590 nm | 608 nm | 69% | 130% |
| 60 → Ca$_2$Lu$_{0.97}$Ce$_{0.03}$Mg$_2$Si$_3$O$_{12}$ | 590 nm | 606 nm | 44% | 106% |

Fig.9

LIGHT MODULE AND METHOD FOR PROVIDING WAVELENGTH-CONVERTED LIGHT IN THE RED SPECTRAL RANGE AND PROJECTION DEVICE THEREFOR

CROSS-REFERENCE TO RELATED APPLICATION

This application claims priority to German Patent Application Serial No. 10 2014 226 591.6, which was filed Dec. 19, 2014, and is incorporated herein by reference in its entirety.

TECHNICAL FIELD

Various embodiments relate generally to a light module for generating wavelength-converted light in the red spectral range by a conversion means, a projection device including such a light module, and a method for providing wavelength-converted light in the red spectral range.

BACKGROUND

Conventional light modules and methods for generating wavelength-converted light by means of conversion means, such as phosphors, for example, in which excitation light, e.g. monochromatic light from a laser diode, is radiated onto the phosphor and the latter emits light having a converted, usually greater, wavelength. In the case of phosphors, as is known, the problem occurs that they exhibit a decrease in the conversion efficiency with an increase in the pump power and pump power density of the excitation light. An increase in the pump power leads to an increase in the average temperature and, via the temperature dependence of the conversion efficiency, to a saturation of the output power (thermal quenching). A further cause that leads to a saturation of an output power when the pump power density is increased is intensity quenching, that is to say that a reduced population density of the lower pump level of the phosphor occurs on account of the comparatively long lifetime of the participating activator states of the phosphor. A further problem additionally consists in the fact that these effects, such as thermal quenching and intensity quenching, are manifested to different extents in the case of different phosphors. Especially red phosphors exhibit a very great reduction of the conversion efficiency when the pump power is increased.

In the case of light modules, for example for projectors, in which different phosphors are used for generating e.g. green, yellow and red light, the limitation of the pump power in the red channel leads to a lower red luminous flux that limits the total luminous flux of the projectors or adversely influences the white point. Furthermore, conventionally, the use of red phosphors with as little thermal quenching as possible is provided. However, these red phosphors then have a short dominant wavelength in the orange-red range that leads to a reduction of the size of the addressable color space. In this case, the dominant wavelength of a spectral composition should be understood to mean the wavelength at which a narrowband, monochromatic excitation in the human eye brings about the same color impression as a wider light distribution with the corresponding dominant wavelength. However, alternatively available LEDs for the red channel having a longer dominant wavelength likewise limit the total luminous flux in hybrid projectors on account of their low luminance.

In LARP applications (Laser Activated Remote Phosphor), a high optical input power is concentrated on a conversion phosphor in order to obtain converted light for use in the apparatus. For projection applications it is necessary to provide at least three primary colors—blue, green and red. Blue can easily be provided by LEDs or an exciting laser, in particular laser diodes. Green/yellow can be converted by means of $Ce^{3+}$-doped garnet phosphors in accordance with the prior art (e.g. YAG:Ce or LuAG:Ce) with a good efficiency and reliability even at high activation energies. Red conversion phosphors for LARP applications suffer from various problems, however. The most customary and most tried and tested red conversion phosphors are constructed from materials based on nitridosilicates such as $(Ca,Sr,Ba)_2Si_5N_8:Eu^{2+}$ or $CaAlSiN_3:Eu^{2+}$. They all suffer from durability problems at high temperatures and at high optical energies, e.g. darkening or bleaching. In addition, $Eu^{2+}$-activated phosphors at high optical activation energies lose conversion efficiency (decrease in efficiency).

A number of commercially available systems utilize Eu-doped nitridic conversion phosphors for the red conversion; by way of example, the Osram LARP projection module phaser P1 utilizes a $(Ca,Sr)_2Si_5N_8:Eu^{2+}$-phosphor. The phosphor has to be optimized for the specific application and operating temperatures and also for the emission wavelength provided. It has to be operated under carefully monitored limits. By way of example, it must not overheat, since the phosphor degrades otherwise. However, even then durability problems have to be taken into account. Small variations in the operating conditions can appreciably limit the lifetime of the phosphor.

In this context, WO 2014/019758 A1 discloses a device for providing electromagnetic radiation which includes a radiation arrangement for generating excitation radiation and at least one conversion element for generating conversion radiation. The conversion element includes at least one phosphor and is arranged at a distance from the radiation arrangement in a beam path of the excitation radiation. A coarse-grained nitridosilicate having a median grain size $d_{50}$ in the range of 10 to 30 µm is suitable as phosphor.

SUMMARY

A light module may include a conversion means, which is designed to absorb excitation radiation having a first wavelength of an absorption spectrum and to convert it into light having a second wavelength of an emission spectrum. The light module includes an excitation radiation source designed to emit excitation radiation. The excitation radiation source is arranged in such a way that emitted excitation radiation can be radiated at least indirectly onto the conversion means. The light module includes a spectral filter having a long-pass filter characteristic and having a limiting wavelength. The spectral filter is designed and arranged to reduce the emission spectrum having the second dominant wavelength to the output spectrum having the first dominant wavelength. The conversion means has an emission spectrum having a red spectral component and having a second dominant wavelength and having a full width at half maximum of at least 120 nm.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 8 shows a tabular comparison of different silicogarnet embodiments having in each case different cerium dopings and of an yttrium aluminum garnet having cerium doping as a comparative example using an optimized filter characteristic for achieving in each case an identical dominant wavelength, wherein the table shows column by column the phosphors used, the filter edge of the simulated long-pass filter, the dominant wavelength of the resulting spectrum, the proportion of the optical energy which passes through the filter, and the resulting luminous flux compared with the luminous flux of YAG:Ce; and FIG. 9 shows a tabular comparison of different silicogarnet embodiments having in each case different cerium dopings and of an yttrium aluminum garnet having cerium doping as a comparative example with joint use of the same filter characteristic, the table being established analogously to the previous table.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

In comparison with the conventional use of cerium-doped garnet phosphors (YAG, LuAG, YAGaG, LuAGaG, LuYAG, LuYAGaG), the use of silicogarnet phosphors according to the construction scheme $(AE_{3-x-y}Lu_xCe_y)(Mg_{1-z}Sc_z)_2(Si_{1-q}Ge_q)_3O_{12}$ may yield much higher efficiencies for the filtered red light since the emission is shifted distinctly toward higher wavelengths compared with the conventional phosphors. Therefore, less filtering out from the yellow side of the spectrum has to be effected in order to obtain red light.

Figure 1:
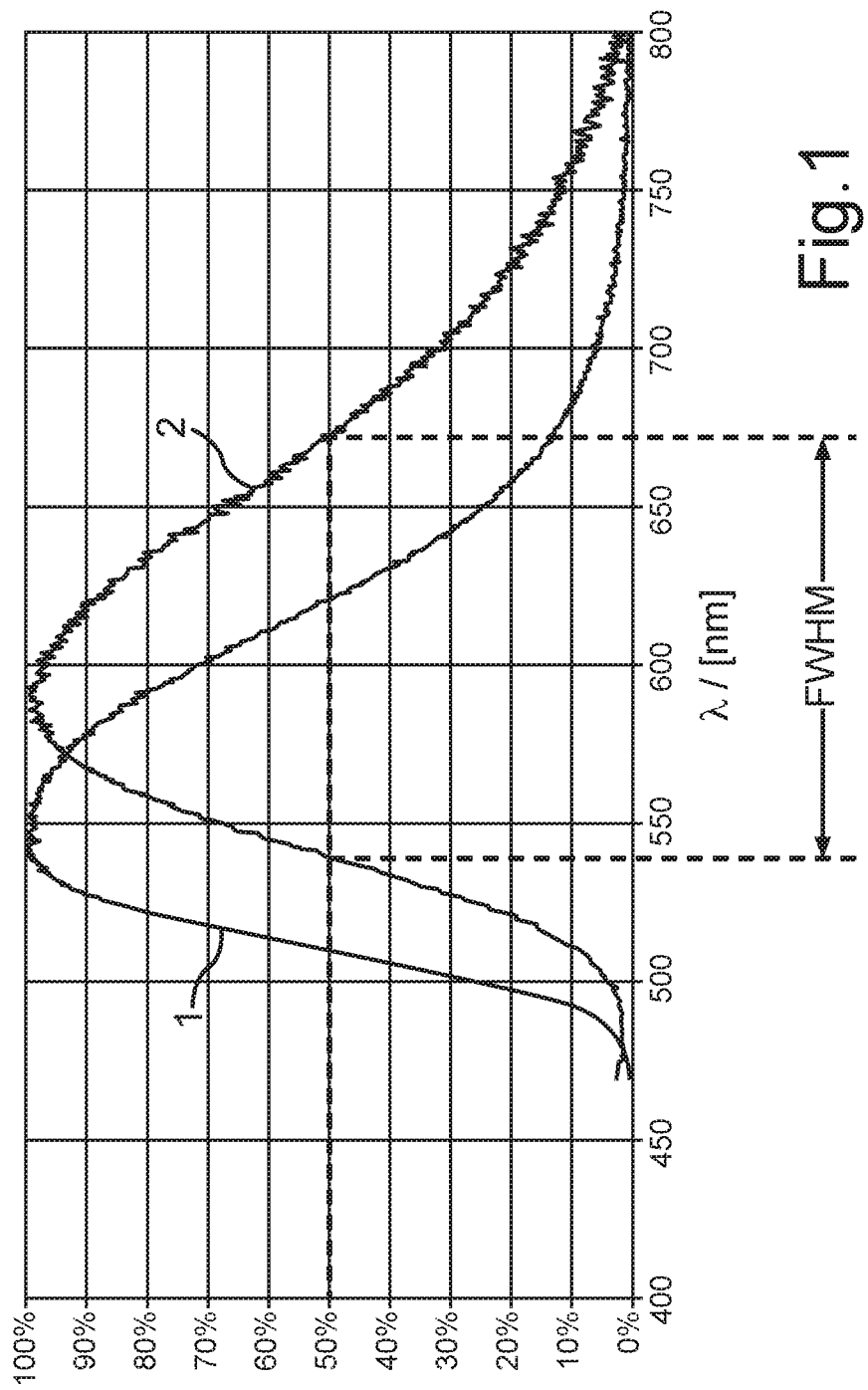
FIG. 1 shows a schematic illustration of the emission spectra of an yttrium aluminum garnet having cerium doping (YAG:Ce) and of a silicogarnet ($Ca_2Lu_{1.94}Ce_{0.06}Mg_2Si_3O_{12}$) in normalized comparison.
Figure 2:
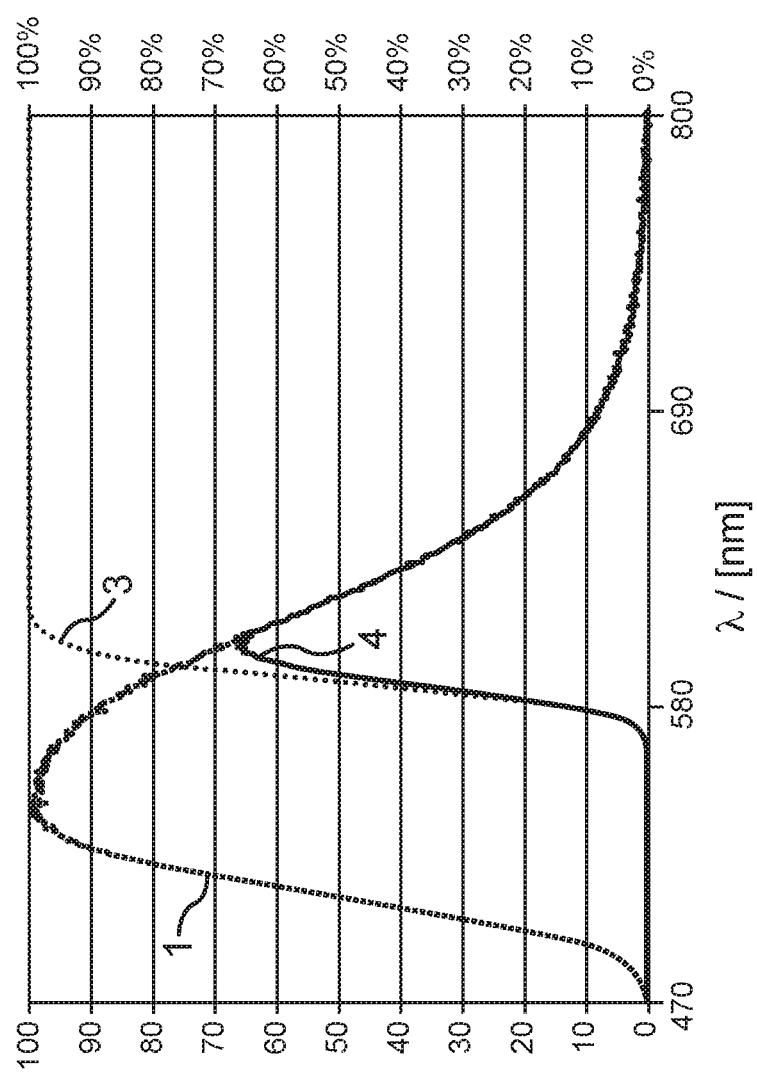
FIG. 2 shows a schematic illustration of the emission spectrum of the yttrium aluminum garnet having cerium doping (YAG:Ce), a simulated long-pass filter characteristic and the YAG:Ce-emission spectrum filtered thereby.
Figure 3:
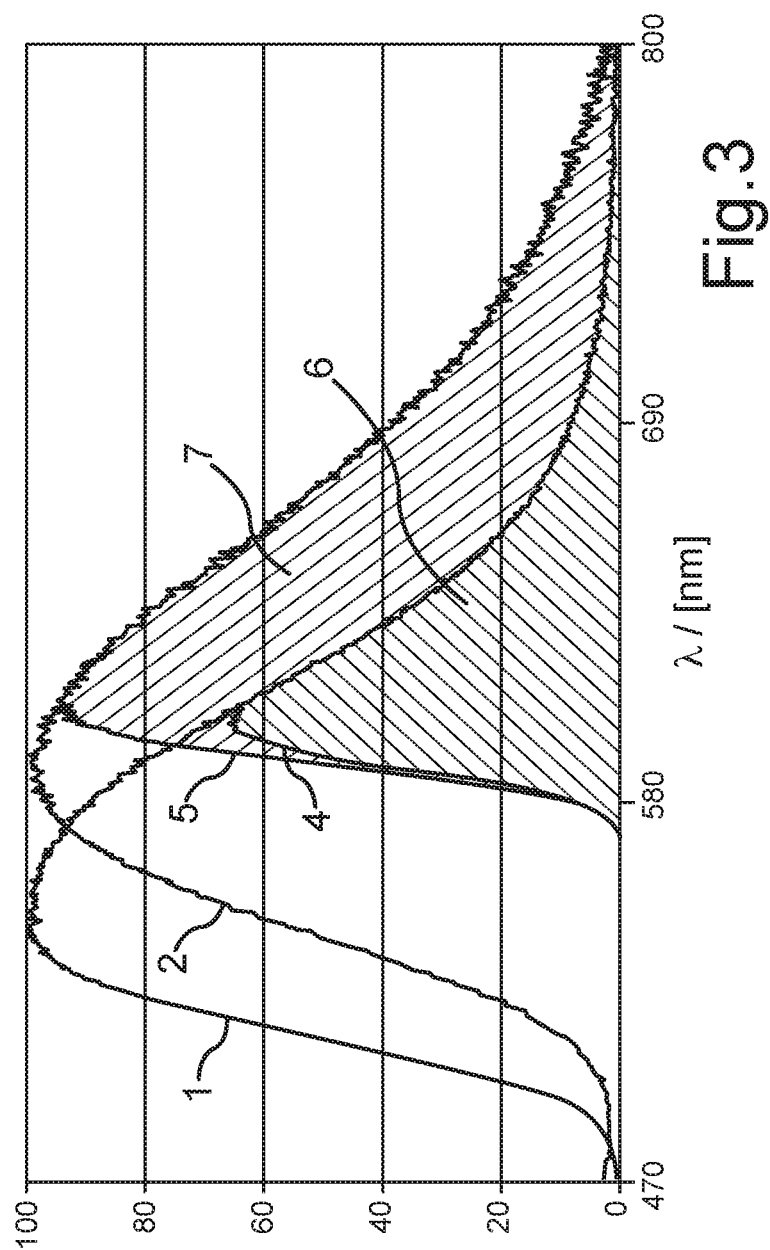
FIG. 3 shows a schematic illustration of the emission spectra and the filtered spectra of the yttrium aluminum garnet having cerium doping (YAG:Ce) and of the silicogarnet ($Ca_2Lu_{1.94}Ce_{0.06}Mg_2Si_3O_{12}$) in normalized comparison.

This is illustrated in FIG. 1 to FIG. 3 for conventional YAG:Ce and for one exemplary sample $CaLu_{1.94}Ce_{0.06}Mg_2Si_3O_{12}$ of a silicogarnet phosphor.

FIG. 1 shows a first emission spectrum 1 of a YAG:Ce phosphor and a second emission spectrum 2 of a silicogarnet phosphor $CaLu_{1.94}Ce_{0.06}Mg_2Si_3O_{12}$. In this case, the wavelength $\lambda$ in nm (nanometers) is plotted on the abscissa between 400 nm and 800 nm. The ordinate is scaled from 0% to 100%, the first emission spectrum 1 and the second emission spectrum 2 being represented in each case in a normalized manner such that they assume their respective maximum at 100%. Furthermore, a full width at half maximum FWHM of the second emission spectrum 2 is entered by way of example, which results from the difference between the two wavelength values for which the respective function value has fallen to half the maximum, that is to say to 50% in the case illustrated. The significantly greater full width at half maximum FWHM of the second emission spectrum 2 in comparison with the first emission spectrum 1 is noticeable here.

FIG. 2 shows the first emission spectrum 1 of the YAG:Ce and a filter characteristic 3 in the form of a filter transmissivity curve as a function of the wavelength for a simulated long-pass filter having a filter edge at 590 nm. A first filter output spectrum 4, which results from the first emission spectrum 1 upon passing through the filter, is likewise illustrated. As can readily be discerned, the majority of the energy is lost in the filter. The first emission spectrum 1, the filter characteristic 3 and the first filter output spectrum 4 are in each case plotted here over the wavelength of 470 nm to 800 nm. The first emission spectrum 1 and the first filter output spectrum 4 are normalized here to the same scale at which a value of 100 results at the maximum of the first emission spectrum. The filter characteristic 3 is scaled in the range of 0% to 100%, wherein, in the range in which the filter characteristic 3 assumes the value 0% or close to 0%, the value of the first filter output spectrum 4 also assumes zero or a negligibly small value and, in the ranges in which the filter characteristic 3 is 100%, the first filter output spectrum 4 assumes the same value as the first emission spectrum 1. In other words, the respective value of the first filter output spectrum 4 at a specific wavelength $\lambda$ results from the first emission spectrum 1 at said wavelength $\lambda$ multiplied by the value of the first filter output spectrum 4 at the corresponding value of $\lambda$. The first filter output spectrum 4 has a dominant wavelength of 604 nm, which is well within the red spectral range.

FIG. 3 shows a comparative illustration of the first emission spectrum 1 (YAG:Ce) and of the second emission spectrum 2 ($CaLu_{1.94}Ce_{0.06}Mg_2Si_3O_{12}$), and of the first filter output spectrum 4 and of a second filter output spectrum 5, which is applied by applying a filter function with a configuration comparable to the filter characteristic 3. The filter characteristic to be applied was selected in each case such that the first filter output spectrum 4 and the second filter output spectrum 5 in each case have the same dominant wavelength of 604 nm. A first filter output spectrum integral 6 and a second filter output spectrum integral 7 are additionally illustrated, which in each case represent the area below the first filter output spectrum 4 and the second filter output spectrum 5, respectively. In the case of the second filter output spectrum 5, far less energy is lost in the filter compared with the first filter output spectrum 4. The scaling of abscissa and ordinate is identical here to that in FIG. 2.

Figure 4:
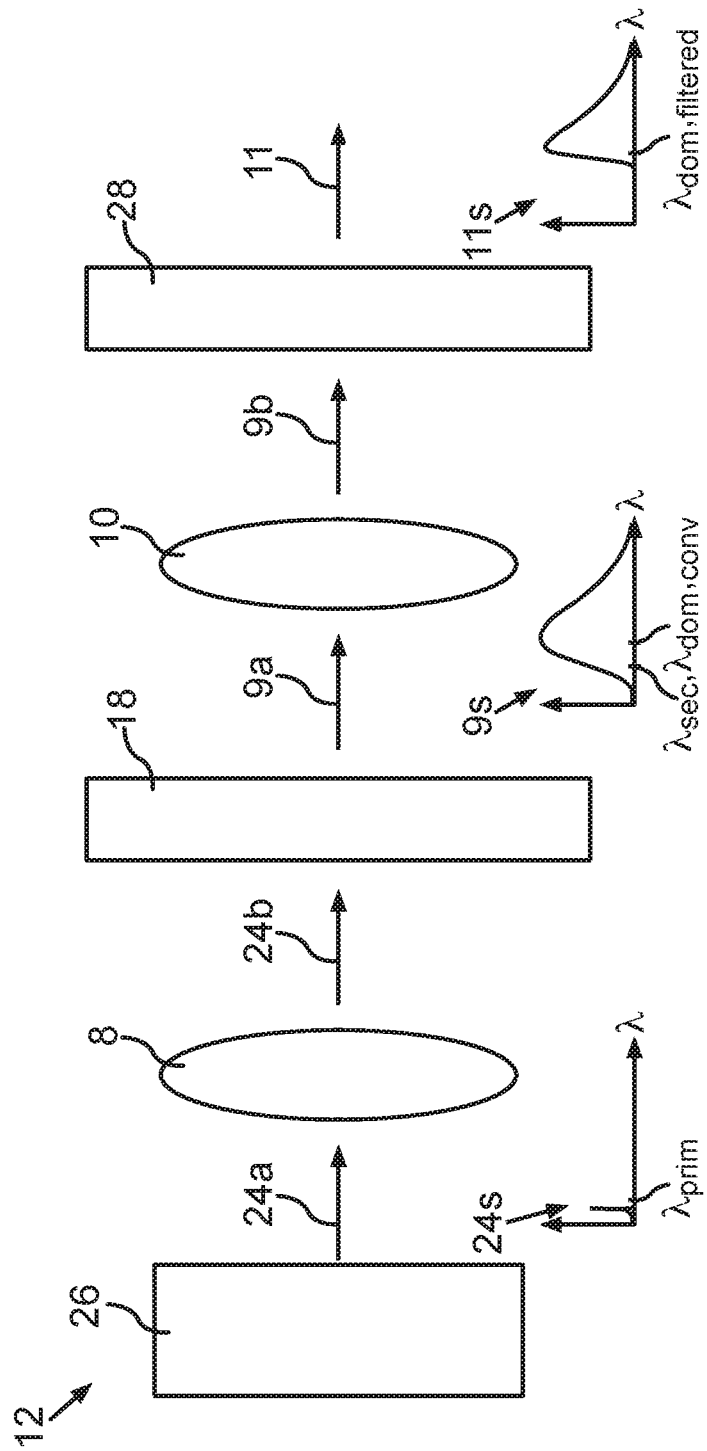
FIG. 4 shows a simplified schematic illustration of various embodiments of a light module.

FIG. 4 shows one embodiment of a light module 12, wherein the concept of filtered conversion according to various embodiments is applied. An excitation radiation source 26 having a high radiation power density, for example a laser or laser diodes, emits—usually in the form of blue light—an excitation radiation 24a having an excitation radiation spectrum 24s. The excitation radiation 24a passes through a primary optical unit 8 and leaves the latter again as excitation radiation 24b having the excitation radiation spectrum 24s without change.

The excitation radiation 24b impinges on a conversion means 18, which brings about a wavelength conversion in the direction of higher wavelengths. A converted light 9a emerging from the conversion means 18 has an emission spectrum 9s, wherein said emission spectrum 9s is also present in the case of a converted light 9b which has passed through a secondary optical unit 10. The conversion means 18 can be, for example, a static phosphor target object, a static ceramic target object or else a single-crystal target object.

The converted light 9b in the further course impinges on a spectral filter 28, wherein filtered light 11 which has passed through the spectral filter 28 has an output spectrum 11s. The spectral filter 28 can be, for example, a glass filter, a dielectric filter, a transmission filter or a reflection filter. The spectral filter 28 can also be arranged directly on the conversion means 18, wherein the optional secondary optical unit 10 can be omitted and the converted light 9a is identical to the converted light 9b, by which in particular the beam path is meant. By means of the conversion means 18, the excitation radiation 24b having an excitation spectrum 24s having at least one first wavelength $\lambda_{prim}$ is converted into converted light 9a having an emission spectrum 9s having at least one second wavelength $\lambda_{sec}$, wherein the at least one second wavelength $\lambda_{sec}$ is greater than the at least one first wavelength $\lambda_{prim}$. A second dominant wavelength $\lambda_{dom,conv}$ results from the emission spectrum 9s, wherein the converted light 9a after optionally passing through the secondary optical unit 10 as converted light 9b has the same emission spectrum 9s. The latter is converted by the spectral filter 28 into the filtered light 11 having the output spectrum 11s having a first dominant wavelength $\lambda_{dom,filtered}$.

Figure 5:
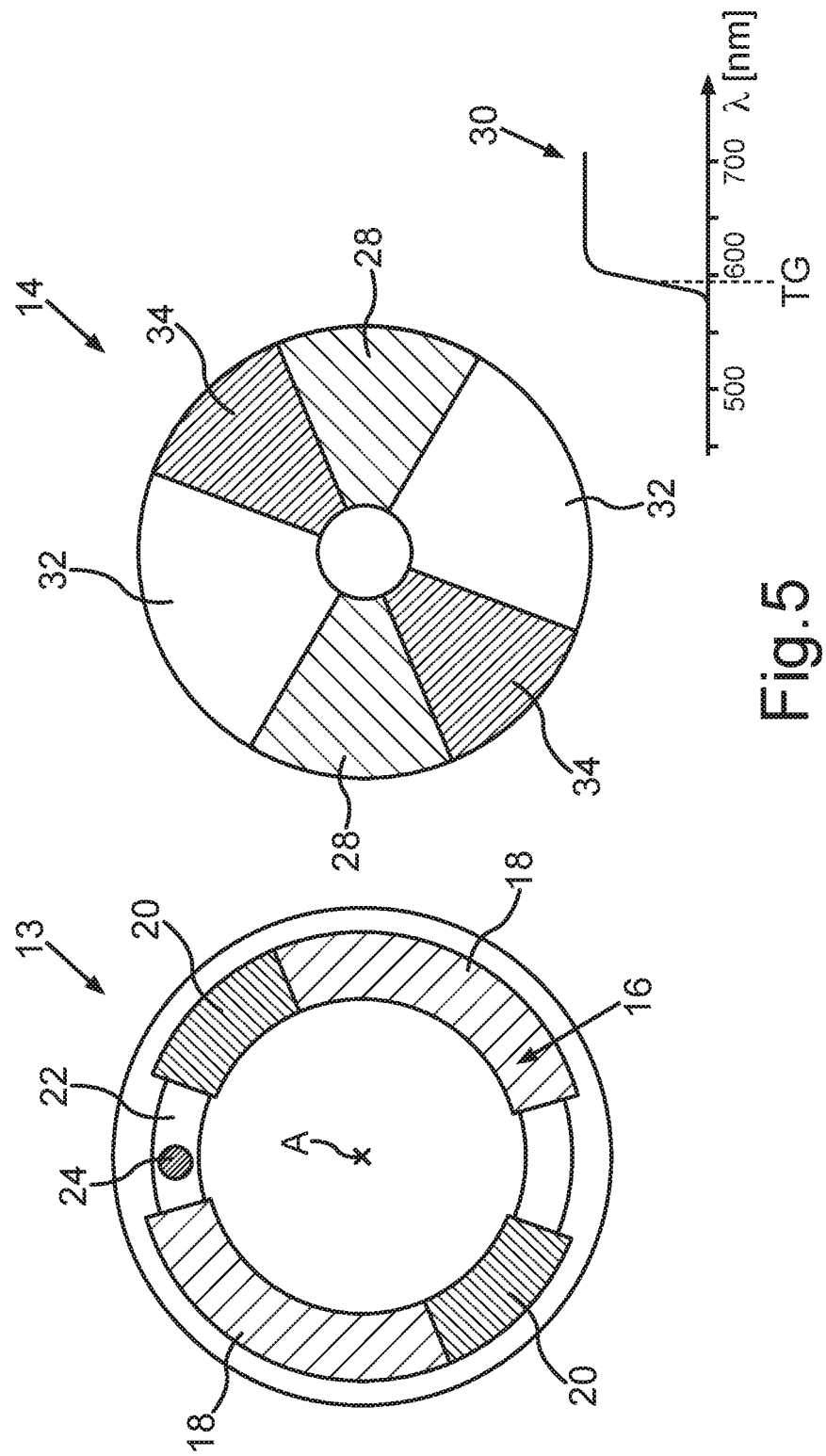
FIG. 5 shows a simplified schematic illustration of various embodiments of a phosphor wheel and of a corresponding filter wheel of a projection device.

FIG. 5 shows a schematic illustration of a phosphor wheel 13 and of a corresponding filter wheel 14 for a projection device 15 (cf. FIG. 6) in accordance with a further embodiment. In this case, the phosphor wheel 13 is embodied as rotatable about the rotation axis A and has a segmented region 16 running around the rotation axis A in a ring-shaped manner. In this case, an orange-red phosphor 18 is arranged in two segments of said region 16 and a green phosphor 20 is arranged in two further segments of said region 16. A further two segments of the ring-shaped region 16 have no phosphor, but rather are embodied with a through opening 22. The circle illustrated in the upper through opening 22 is intended here to represent schematically the excitation radiation 24 of the excitation radiation source 26 that is focused onto the phosphor wheel 13 (cf. FIG. 6). By means of the rotation of the phosphor wheel, each segment of the ring-shaped region can thus be irradiated sequentially with the excitation radiation 24. As a result of the excitation of the orange-red phosphor 18 by means of the excitation radiation 24, the orange-red phosphor 18 emits light having an emission spectrum which has in particular a second dominant wavelength $\lambda_{dom,conv}$ in the orange-red spectral range. Likewise, upon excitation by the excitation radiation 24, the green phosphor 20 emits light having an emission spectrum having a dominant wavelength in the green spectral range. The light emitted by the phosphors 18 and 20 and also the excitation radiation 24 transmitted through the through opening 22 of the phosphor wheel 13 can be focused onto the filter wheel 14 e.g. by suitable optical elements.

The filter wheel 14 has a plurality of circle-segment-shaped regions. In this case, a spectral filter is arranged in two of said regions, said spectral filter filtering light that impinges on it in accordance with the long-pass filter characteristic 30 illustrated. Said spectral filter 28 transmits light having a wavelength above its limiting wavelength TG and is substantially non-transmissive for light having wavelengths shorter than the limiting wavelength TG. Said spectral filter 28 is designed, then, to filter the light emitted by the orange-red phosphor 18 in such a way that the first dominant wavelength $\lambda_{dom,filtered}$ of the resultant wavelength spectrum of the filtered light is greater, e.g. by a predefinable value determined by the limiting wavelength TG of the spectral filter 28, than the second dominant wavelength $\lambda_{dom,conv}$ of the emission spectrum of the orange-red phosphor 18. Consequently, by means of filtering, it is possible to generate light in the red spectral range which, for the same excitation radiation surface power density, has a significantly higher luminous flux than the light emitted by a red phosphor and having a comparable or the same dominant wavelength, since the significantly higher conversion efficiency of the orange-red phosphor 18 more than just compensates for the light losses arising as a result of the filtering. In this case, this luminous flux advantage is all the greater, the higher the excitation radiation surface power density of the excitation radiation 24. Therefore, it may be provided to irradiate the orange-red phosphor 18 for excitation with an excitation radiation surface power density of approximately at least 1 kW/cm².

In two further circular segments 32 of the filter wheel 14, the filter wheel 14 can be embodied such that it is light-transmissive, that is to say e.g. without a wavelength filter. Consequently, by means of corresponding movement of the filter wheel 14 and of the phosphor wheel 13 in conjunction with furthermore appropriately corresponding embodiment of the segments of the phosphor wheel 13 and of the filter wheel 14, part of the light emitted by the orange-red phosphor 18 can be radiated onto the regions having the spectral filters 28 of the filter wheel 14 and part of the emission light can be radiated onto the light-transmissive regions 32 of the filter wheel 14. In this regard, light in the orange and simultaneously also in the red spectral range can be generated by only one phosphor, namely the orange-red phosphor 18. Furthermore, the light-transmisssive region 32 of the filter wheel 14 can also be embodied in a manner corresponding to the phosphor wheel 13 in such a way that the excitation radiation 24 which passes through the phosphor wheel 13 through the through openings 22 can also be radiated onto the light-transmissive regions 32 of the filter wheel 14 and can pass through the latter without any change in the spectral distribution.

Furthermore, a further filter is arranged in two further circle-segment-shaped regions of the filter wheel 14, said further filter here being embodied as a short-pass filter 34 and being designed to filter out the yellow spectral component of the light radiated from the green phosphor 20 onto said short-pass filter 34, such that the dominant wavelength of the emission spectrum of the green phosphor 20 is shifted toward shorter wavelengths. The color space addressable by combination of the phosphor light and the excitation radiation 24 can be increased as a result. These short-pass filters 34 illustrated here are merely optional. Alternatively, these regions in which the short-pass filters 34 are arranged can also be embodied such that they are light-transmissive, in particular in the manner of the light-transmissive regions 32.

The filters, that is to say the spectral filters 28 and the short-pass filters 34, can furthermore be applied as coating on one side of the filter wheel 14. Furthermore, an antireflection layer can be applied on the other side of the filter wheel 14, e.g. across all regions through which light can be radiated, in order to minimize light losses as a result of reflection.

Moreover, further different phosphors, e.g. cyan and/or magenta phosphors, can also be arranged on the phosphor wheel 13. Equally, instead of the orange-red and green phosphors described, other phosphors can also be arranged on the phosphor wheel 13 and/or the phosphor regions can be embodied differently in terms of their arrangement, embodiment and size. In order to provide a color space through combination of primary colors, red, green and blue are primarily advantageous as primary colors. Consequently, it is also possible to embody the segment of the phosphor wheel 13 having the orange-red phosphor 18 in terms of its size and arrangement such that light emitted by the orange-red phosphor 18 is radiated almost completely, in particular apart from unavoidable light losses, onto the spectral filter or spectral filters 28. However, light in the yellow spectral range that is additionally available for combination has the advantage that the addressable color space can be increased by this means as well. Provision can also be made for arranging a red phosphor on the phosphor wheel 13 as an alternative or in addition to the orange-red phosphor 18. The light emitted by the red phosphor can be radiated onto the spectral filter 28 of the filter wheel 14 in order to generate light in the red spectral range having a greater dominant wavelength than that of the emission spectrum of the red phosphor itself. In this regard, by way of example, a red hue that brings about an improved subjective color perception can be generated and the addressable color space can in turn be increased as a result. Furthermore, this also affords luminous flux advantages in comparison with the use of red phosphors whose emission spectrums have a higher dominant wavelength as dominant wavelength from the outset.

The segment sizes of the phosphor wheel 13 can also be dimensioned differently, and can be configured depending on the desired luminous flux in individual color channels or the desired luminous flux ratios of the luminous fluxes relative to one another depending on the application.

Figure 6:
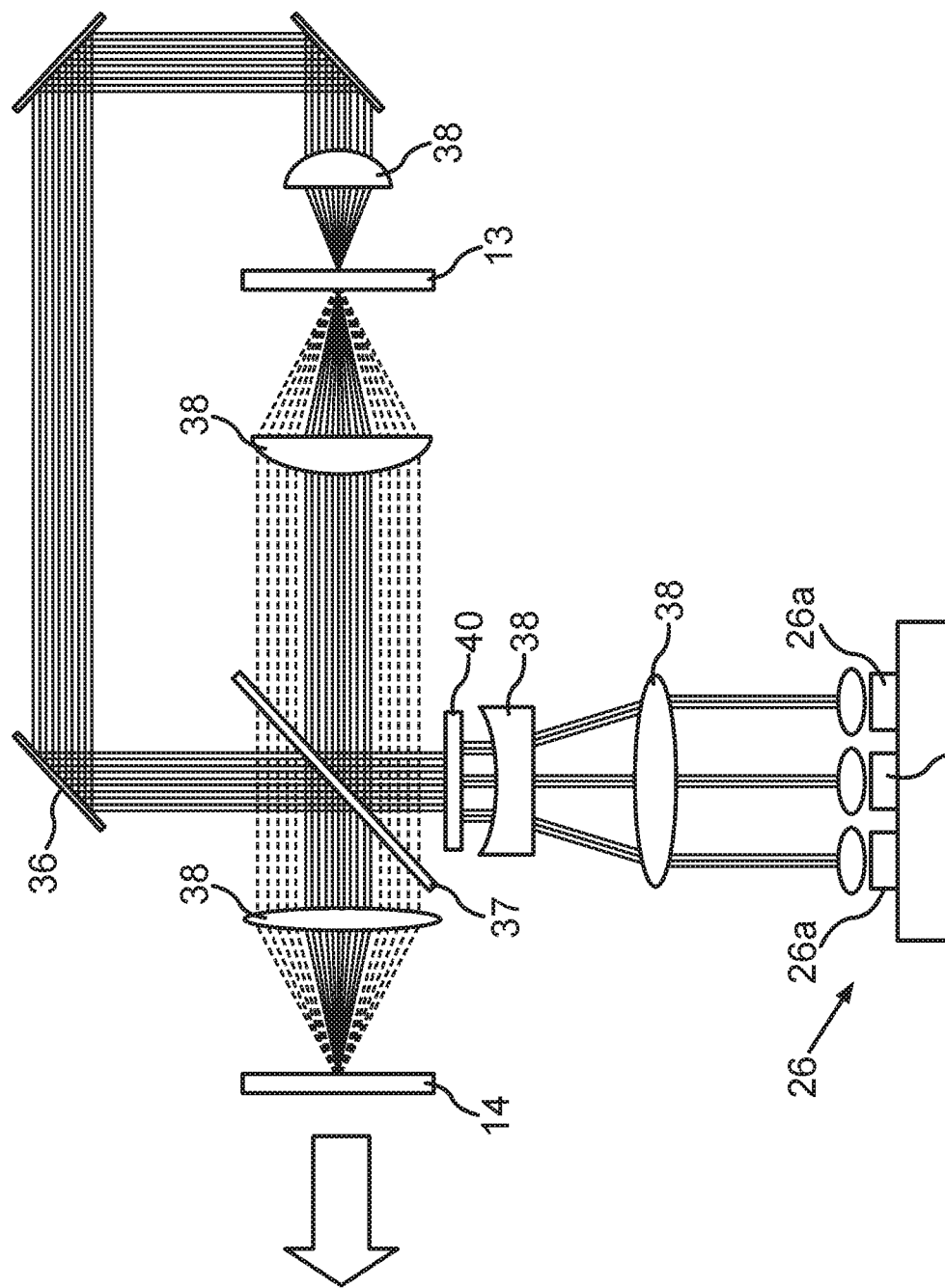
FIG. 6 shows a simplified schematic illustration of one various embodiments of a projection device.

FIG. 6 shows a schematic illustration of a projection device 15 in accordance with various embodiments. In this case, the projection device 15 includes an excitation radiation source 26 embodied as a laser diode array and including a plurality of laser diodes 26a. Other radiation sources would also be conceivable, such as, for example, those including LASER, superluminescene diodes, LEDs, organic LEDs and the like. The excitation radiation source 26 is designed to emit excitation radiation 24 in the blue or ultraviolet spectral range, e.g. in the range of 440-470 nm, e.g. at approximately 450 nm, since this constitutes a suitable excitation wavelength for most phosphors. By means of optical elements 38, 40, the light from said laser diodes 26a is directed onto a conversion means, which can be arranged for example on a phosphor wheel 13. In this case, the phosphor wheel 13 can be embodied e.g. as described with respect to FIG. 5. At least one first phosphor, e.g. an orange-red phosphor 18 (cf. FIG. 5), whose emission spectrum has at least one red spectral component is arranged on the phosphor wheel 13. In this case, further phosphors of a different type can also be arranged on the phosphor wheel 13, which phosphors are arranged in particular in segments of the phosphor wheel 13 and, by means of the rotation of the phosphor wheel 13, can be sequentially irradiated and excited to emit wavelength-converted light. Furthermore, the phosphor wheel 13 has at least one through opening 22, such that the excitation radiation 24 radiated onto the phosphor wheel 13 can be transmitted partly through the phosphor wheel 13. By means of suitable deflection of this transmitted excitation radiation 24, it can be combined with the light converted and emitted by the phosphor wheel 13, for which purpose, for example, an integrator (not illustrated) can also be provided, onto which the combined beam of rays is directed. For deflecting the excitation radiation 24 transmitted through the phosphor wheel 13, three mirrors 36 are provided, for example, which are arranged in the beam path in each case at an angle of 45° with respect to the incident excitation radiation 24. Furthermore, a dichroic mirror 37 is arranged in the beam path between the excitation radiation source 26 and the phosphor wheel 13 and is designed to reflect light in the blue spectral range and transmit light in the non-blue spectral range, that is to say light having higher wavelengths. Moreover, further optical elements, e.g. in the form of lenses 38, which substantially have a focusing and collimating effect, are also arranged in the beam path.

Furthermore, a diffuser 40 is arranged upstream of the dichroic mirror 37 in the beam path in order to generate an expanded intensity profile on the phosphors by means of the scattering of the excitation radiation 24.

The light converted and emitted by the phosphor wheel 13 is emitted in the direction of the dichroic mirror 37 and directed onto a filter wheel 14 by means of optical elements 37, 38. In this case, the filter wheel 14 can be embodied as described in FIG. 5. In this case, the phosphor wheel 13 and the filter wheel 14 correspond in terms of their embodiment, arrangement and movement in such a way that the light emitted by the first phosphor is radiated at least partly onto one or a plurality of spectral filters 28 arranged on the filter wheel 14. The light emitted by other phosphors arranged on the phosphor wheel 13 and the deflected excitation radiation 24 are likewise radiated onto the filter wheel 14, but onto regions of the filter wheel 14 in which no spectral filter 28 is arranged, and can pass through the filter wheel 14 without filtering or likewise pass through a filter.

A series of different examples for solutions including silicogarnets with different filters are presented below. These are respectively compared with solutions which include YAG:Ce with filters as comparative examples. All other phosphors corresponding to the prior art such as LuAG, LuAGaG, YAGaG would perform even worse than YAG:Ce (with the same Ce content) since their main emission is centered at even shorter wavelengths. Therefore, the sole comparison made here is with YAG:Ce as the best suited of all $Ce^{3+}$-doped conventional phosphors.

All the silicogarnet phosphors according to various embodiments were prepared using standard solid-state synthesis at high temperatures (greater than 1200° C.) under a reducing atmosphere. By way of example, standardized high-purity oxides and carbonates, e.g. $CaCO_3$, $MgO$, $Lu_2O_3$, $Sc_2O_3$, $SiO_2$ and $CeO_2$, can be used as starting substance.

Figure 7:
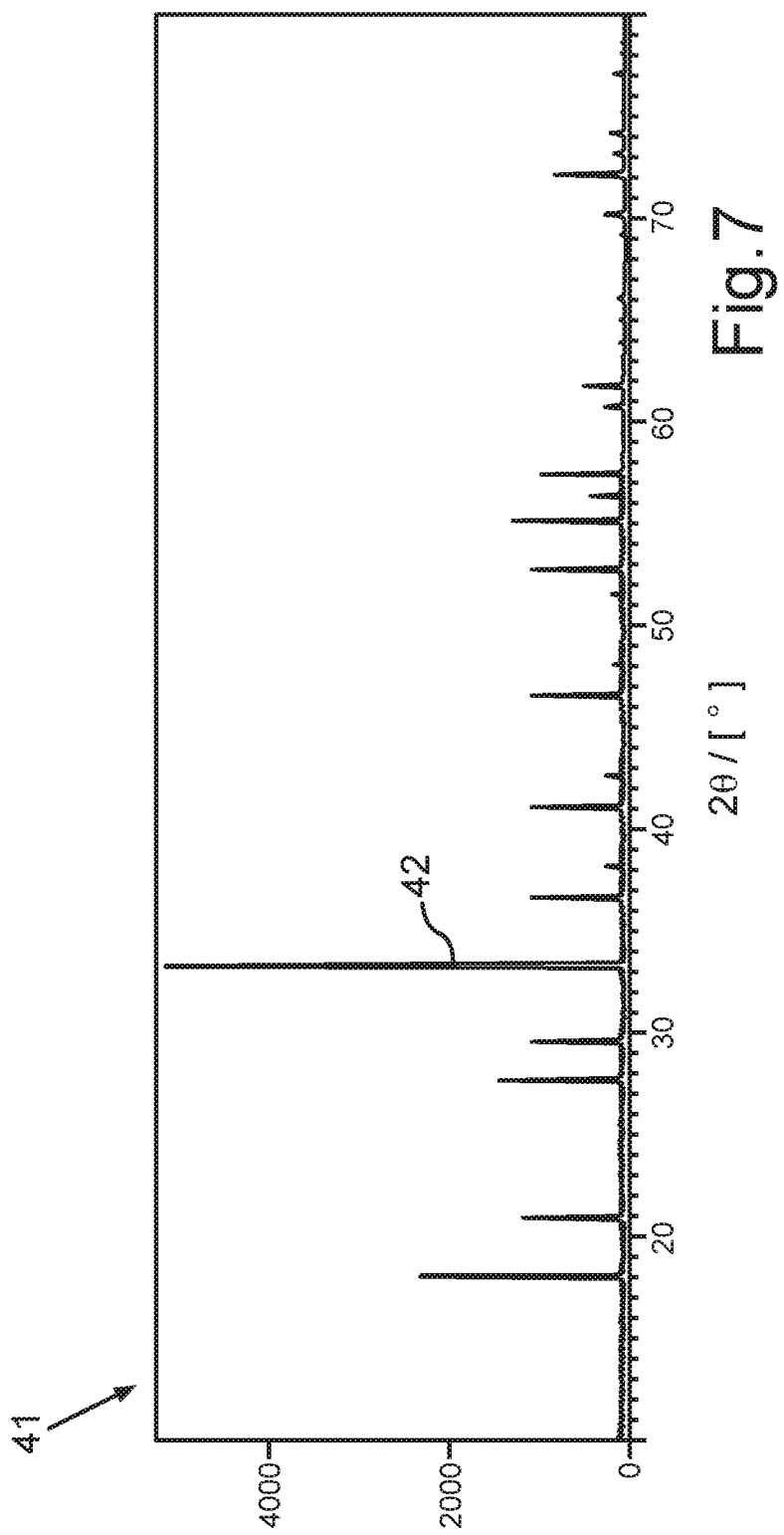
FIG. 7 shows a schematic illustration of a graph produced by means of x-ray diffraction during the analysis of a 100% garnet sample ($CaLu_2Mg_2Si_3O_{12}$:Ce) in powder form.

As an example of the success of the synthesis, FIG. 7 shows an x-ray powder diffraction measurement trace 41 with a counting result 42 as a function of a diffraction angle $2\theta$ in angular degrees with a Rietveld refinement applied to a sample of the silicogarnet phosphor $CaLu_{1.94}Ce_{0.06}Mg_2Si_3O_{12}$ examined in powdered form. All silicogarnet phosphors treated here were obtained with high purity. For details concerning preparation, reference is made at this juncture to U.S. Pat. No. 7,094,362 B2.

X-ray diffraction (XRD) is a standardized method for presenting diffraction structures which are produced by the three-dimensional lattice of a crystal, for example, and which are in absolute terms characteristic of the underlying lattice. FIG. 7 shows a pure sample composed of only this garnet with this structure, which is present as powder composed of small crystallites. In a further phase, a distinct deviation would be discernible in the diagram. The x-ray powder diffraction measurement trace 41 was recorded according to the standard method with a diffraction angle of 2θ.

A first solution approach is based on a silicogarnet phosphor $CaLu_{1.94}Ce_{0.06}Mg_2Si_3O_{12}$ and a long-pass filter having a filter edge at 584 nm (cf. row 49, FIG. 8). A long-pass filter having a filter edge at 590 nm is used in a second arrangement of the first solution approach (cf. row 58, FIG. 9).

A second solution approach is based on a silicogarnet phosphor $CaLu_{1.8}Ce_{0.2}Mg_2Si_3O_{12}$ and a long-pass filter having a filter edge at 583 nm (cf. row 50, FIG. 8). A long-pass filter having a filter edge at 590 nm is used here in a second arrangement of the second solution approach (cf. row 59, FIG. 9).

A third solution approach is based on a silicogarnet phosphor $Ca_2Lu_{0.97}Ce_{0.03}MgScSi_3O_{12}$ and a long-pass filter having a filter edge at 587 nm (cf. row 51, FIG. 8). A long-pass filter having a filter edge at 590 nm is used in a second arrangement of the third solution approach (cf. row 60, FIG. 9).

All three solution approaches involve irradiation in each case with blue light (460 nm) as excitation radiation.

FIG. 8 shows the comparison between the silicogarnet/filter solution approaches presented in this invention compared with the solution with a conventional YAG:Ce. The arrangements illustrated in this table aimed to obtain light having the same dominant red wavelength (604 nm) for each of the solutions presented. The overview table has five columns 43, 44, 45, 46 and 47 and four rows 48, 49, 50 and 51. The first column 43 lists the comparative material (YAG:Ce) and furthermore in each case the material of the three solution approaches mentioned above. The second column 44 contains values for the filter edge length $\lambda_{filter}$. The third column 45 contains values for the first dominant wavelength $\lambda_{dom,filtered}$. The fourth column 46 contains values for an energetic filter transmission factor $E_{filtered}/E_{unfiltered}$. The fifth column 47 contains values for a luminous flux factor $\Phi_V/\Phi_{V,YAG}$.

The energetic filter transmission factor $E_{filtered}/E_{unfiltered}$ is a measure of the energy lost as a result of the application of the filter. The less energy is transmitted by the filter, the more poorly suited the latter is to the application. By way of example, during the filtering of YAG:Ce for red light only 35% of the light energy can be utilized. Every silicogarnet from the three solution approaches exhibits better behavior in this regard (utilizable energy of from 46% to 74%).

The most important value, however, is the luminous flux factor $\Phi_V/\Phi_{V,YAG}$. It shows the relative magnitude of the luminous flux obtained with the use of a silicogarnet with filtering in comparison with YAG. By way of example, between 14% more light for the third solution approach and 54% more light for the second solution approach is obtained compared with YAG:Ce with the use of a silicogarnet solution. The energetic filter transmission factor $E_{filtered}/E_{unfiltered}$ is the lowest of all the examples for YAG:Ce. Each of the three solution approaches with a silicogarnet provides far more transmitted energy (more than twice as much in the case of the second solution approach), thus resulting in a significant advantage. The luminous flux factor $\Phi_V/\Phi_{V,YAG}$ between the individual solutions and the comparative example (YAG:Ce filtered) is likewise much higher for solutions with silicogarnets than with conventional YAG:Ce. With the first solution approach (second row 49) and the second solution approach (third row 50), the total luminous efficiency is even approximately 50% higher than for the comparative example in the first row 48.

FIG. 9 shows a similar comparison, but using the same filter for each solution approach. The table has the columns 52, 53, 54, 55 and 56 and the rows 57, 58, 59 and 60. The layout and the arrangement of values are identical to the table in accordance with FIG. 8. In this arrangement, during the filtering of YAG:Ce for red light only 34% of the light energy can be utilized (first row 57). Every example of the silicogarnets (rows 58, 59 and 60) exhibits better behavior in this regard (utilizable energy of from 44% to 69%). The luminous flux factor $\Phi_V/\Phi_{V,YAG}$ as the most important value shows a relative magnitude of the luminous flux which is obtained with the use of a silicogarnet with filtering in comparison with a YAG (first row 57). Between 6% for the first solution approach (row 58) and 30% more light for the second solution approach (row 59) on the basis of silicogarnets can be obtained in comparison with a YAG:Ce-based solution. In addition, all the silicogarnets with filtering arrive at higher dominant wavelengths than YAG:Ce with filtering and hence a better red and a possibly higher color space in display applications.

Here, too, the transmitted energy by means of the filter is increased when using a solution with a silicogarnet phosphor in comparison with a YAG:Ce. This increase is approximately 10% for the third solution approach (row 60), but the transmitted energy is even twice as much for the second solution approach (row 50). This translates to a significant increase in the luminous flux with all three solution approaches (rows 58 to 60). The increase is 6% for the third solution approach (row 60) and rises to approximately 30% for the first and second solution approaches (rows 58 and 59). In addition to the rise in transmitted energy and luminous flux, the dominant wavelength is improved here for all three solution approaches involving silicogarnets with filtering in comparison with conventional YAG:Ce. They can thus provide more brilliant colors and a higher color gamut.

As can be discerned, phosphors in embodiments as silicogarnets in combination with filters have considerable advantages in every respect over conventional YAG:Ce-based phosphors. They lose less energy (higher light transmissivity), provide a higher luminous flux and in this case can provide even higher dominant wavelengths than conventional solutions.

Eu-doped nitridic phosphors or nitride phosphors that constitute the traditional red LED phosphors can have less activator, as a result of which they become more efficient, but the color locus is also shifted as a result. Cerium is more efficient by a multiple.

Silicogarnets have a very wide emission, although the latter normally is not desired for traditional use. YAG-Ce and LuAG-Ce also have significantly wider emission than nitridic red phosphors, the emission being so much more efficient that filtering of the spectrum that is too wide for the application is worth doing. Aluminum garnets are usually used as phosphors, wherein aluminum can be replaced by gallium. Furthermore, a rare earth element and twelve oxygen atoms are contained in each case.

Customary emissions have values of full width at half maximum of 80 nm to 110 nm full width at half maximum. Silicogarnets may have 120 nm or more, e.g. 130 nm, and high-performance phosphors in the display sector usually have scarcely more than 80 nm. Consequently, the resulting distinguishing criterion is the so much wider emission and a long-wave edge that is very much further in the red range. YAG:Ce can be shifted in the red direction by approximately 2-3 nm proceeding from 110 nm, for example, by means of a Co doping; the full width at half maximum becomes insignificantly wider in this case. A customary limit here should be 120 nm. The silicogarnet exhibits for a garnet far red and very wide emission in relation to YAG; in this case, the dominant wavelength results from the spectral distribution weighted with the eye sensitivity.

Silicogarnets usually have a centroid at approximately 610-620 nm, and YAG approximately at 585 nm. Since the eye sensitivity is significantly stronger in the green, a dominant wavelength is better suited to the assessment than an intensity based on energy values.

The europium-doped phosphors are traditionally used as nitride phosphors. In the orange-red range, the cerium-doped phosphors are superior since no decrease at higher powers is known to date. They are thus far superior to the europium-doped phosphors. The half-life of the excited state is very much shorter than in the case of europium. Values in the nanoseconds range are involved here, while values in the microseconds range can be recorded in the case of europium.

On account of these properties, garnets having long-wave emission, e.g. silicogarnets, the emission spectrum of which has a falling edge only far in the red range owing to the very wide emission, in conjunction with a spectral filter which adapts the emission spectrum to the predefined dominant wavelength of the filtered red, are one possible choice for applications having a very high power density.

The embodiments, e.g. the three solution approaches, serve merely for explaining various embodiments and are not restrictive for the various embodiments. In this regard, doping proportions, in particular the magnitude of the cerium doping, can deviate without departing from the concept of the various embodiments.

Various embodiments provide a light module, a projection device and a method for generating wavelength-converted light in the red spectral range which enable an increase in efficiency at high pump powers and pump power densities.

Various embodiments are based on the insight that by filtering, e.g. by suitable spectral filtering of an emission spectrum of an orange and/or orange-red phosphor, the dominant wavelength of said emission spectrum can be shifted toward higher wavelengths, specifically in such a way that the dominant wavelength of the long-pass filtered orange phosphor and/or orange-red phosphor is greater than or equal to the dominant wavelength of an unfiltered red phosphor. As a result, for generating light in the red spectral range having a desired dominant wavelength, it is possible to utilize a phosphor having a shorter dominant wavelength than the light to be generated, but having a higher conversion efficiency, in order to generate the light having the desired dominant wavelength by filtering. Furthermore, various embodiments are based on the insight that at high excitation power densities the advantages of a higher conversion efficiency outweigh the light losses caused by the filtering and luminous flux advantages can thus be achieved.

The light module according to various embodiments for providing wavelength-converted light in the red spectral range having a predefinable first dominant wavelength of an output spectrum includes a conversion means, which is designed to absorb excitation radiation having at least one first wavelength of an absorption spectrum and to convert it into light having at least one second wavelength of an emission spectrum and to emit the latter, wherein the at least one second wavelength is greater than the at least one first wavelength, and an excitation radiation source which is designed to emit excitation radiation having a spectral component within the absorption spectrum, wherein the excitation radiation source is arranged in such a way that excitation radiation emitted by the excitation radiation source can be radiated at least indirectly onto the conversion means. According to various embodiments, the conversion means has an emission spectrum having a red spectral component and having a second dominant wavelength and having a full width at half maximum of at least 120 nm, wherein the light module furthermore includes a spectral filter having a long-pass filter characteristic and having a predefinable limiting wavelength and wherein the spectral filter is designed and arranged in such a way as to reduce the emission spectrum having the second dominant wavelength to the output spectrum having the predefinable first dominant wavelength.

The fact that excitation radiation emitted by the excitation radiation source can be radiated at least indirectly onto the conversion means and the fact that light emitted by the conversion means can be radiated at least partly and at least indirectly onto the spectral filter should be understood in this case such that the excitation radiation source and the conversion means and respectively the conversion means and the spectral filter can be arranged in relation to one another such that the excitation radiation can be radiated immediately and directly to the conversion means and the light emitted by the conversion means can be radiated immediately and directly onto the spectral filter or else such that the excitation radiation can be radiated onto the conversion means and the emitted light can be radiated onto the spectral filter by means of one or a plurality of elements, such as e.g. lenses, imaging collimators, non-imaging collimators, deflection mirrors, beam splitters, in particular dielectric mirrors, diffusers, etc.

The use of a spectral filter makes it possible to use, for generating light in the red spectral range, a conversion means whose emission spectrum has a dominant wavelength that is less than the desired dominant wavelength, that is to say the predefinable first dominant wavelength, of an output spectrum of the light to be generated. Since nowadays many customary red-emitting conversion means, e.g. nitridic red phosphors, usually have a low conversion efficiency at high excitation power densities, various embodiments may afford the possibility of using conversion means which have very low quenching, e.g. at high excitation power densities, and a high conversion efficiency. This may have the major advantage that an increase in the luminous flux can thus be brought about at high excitation power densities, specifically despite the radiation power losses brought about by the filtering. By way of example, this makes it possible to use an orange phosphor or an orange-red phosphor as conversion means and to generate light in the red spectral range by spectral filtering instead of using a red phosphor having a significantly lower conversion efficiency. However, not just orange phosphors or orange-red phosphors can be used to bring about an increase in efficiency when generating red light; it is also possible to use red phosphors whose dominant wavelength is shifted toward a higher, desired, wavelength by spectral filtering. In this case, too, it is possible to obtain an increase in efficiency in comparison with the use of red phosphors that have this desired dominant wavelength without spectral filtering. This increase in efficiency is furthermore manifested to a greater extent, the greater the excitation power density.

Furthermore, the use of a spectral filter makes it possible to arbitrarily select the predefinable first dominant wavelength at least within a predefined range. One is therefore not tied to the dominant wavelengths that are assigned to the respective emission spectrum of a conversion means used. Various embodiments thus make it possible to generate wavelength-converted light in the red spectral range which has a high luminous flux at high excitation power densities, without the need to make compromises here with regard to the dominant wavelength and thus with regard to the color. A wide emission with a full width at half maximum of at least 120 nm results in outstanding efficiency values for the filtered light having the predefinable first dominant wavelength of the output spectrum since enough red component to obtain the desired first dominant wavelength is provided as a result. In various embodiments, in this case, the full width at half maximum can be at least 125 nm, e.g. at least 130 nm. It goes without saying here that the full width at half maximum on the other hand should also not be too high, since otherwise, if appropriate, by means of a short-pass filter, spectral components far in the red range should be filtered out in order to comply with the first dominant wavelength. However, even in the case where said spectral components do not have a disturbing effect on account of the spectral eye sensitivity profile, an unnecessary energy emission is provided as a result and reduces the efficiency. Therefore, it may also be necessary to comply with an expedient upper limit for the full width at half maximum which is at most 200 nm, e.g. at most 180 nm, e.g. at most 160 nm.

Various embodiments disclose solutions which utilize an orange-emitting, cerium-doped silicogarnet phosphor $(AE_{3-x-y}Lu_xCe_y)(Mg_{1-z}Sc_z)_2(Si_{1-q}Ge_q)_3O_{12}$ with AE=Ca, Sr, Ba; x=0 ... 2-y; y=0 ... 0.6; z=0 ... 1; q=0 ... 1, as conversion means and a long-pass filter for filtering out the red side of the spectrum. An overview of this solution can be found in FIG. 4. With the use of silicogarnets of this type, according to present knowledge, the problems presented in the introduction may completely avoided or at least reduced, which problems can result from the use of Eu-doped nitridic red phosphors such as, for example:

decrease in efficiency that occurs at higher irradiation densities:
compared with the $Ce^{3+}$ emission, the $Eu^{2+}$ emission is much slower, which can bring about saturation effects, for example;
thermal problems:
a smaller Stokes shift occurs and, therefore, less energy that is lost directly in the phosphor has to be dissipated; this results in lower thermal quenching and better durability;
stability problems:
nitridic red phosphors are sensitive to degradation at high radiation power densities and/or temperatures—e.g. in relation to oxygen and moisture; garnet phosphors, however, are stable even under extreme conditions.

In various embodiments, the second dominant wavelength can be in an orange-red spectral range, e.g. between 575 nm and 600 nm, e.g. between 580 nm and 595 nm. The conversion means can be embodied for example as an orange-red garnet phosphor.

Such orange-red garnet phosphors have a very high conversion efficiency particularly at high power densities, particularly in comparison with red phosphors such as Eu-doped nitridic phosphors, for example, such that the increase that can be brought about in the luminous flux of the red light by a filtering of the emission spectrum of the garnet phosphor is particularly high. A further particularly great advantage may be, moreover, that not only is it possible to achieve an increase in efficiency and a higher red luminous flux, but garnet phosphors are generally significantly more cost-effective than nitridic red phosphors. In this regard, therefore, by using a garnet phosphor for generating red light, it is thus possible to achieve a cost saving as well.

In various embodiments, the conversion means is embodied as a silicogarnet phosphor having a cerium doping. This affords the effect, for example, in relation to a europium doping, for example, that a significantly shorter lifetime of the activator states is established and saturation effects may thus be avoided. By way of example, the silicogarnet phosphors can be constructed according to the following scheme:

$CaLu_{2-x}Ce_xMg_2Si_3O_{12}$ or $Ca_2Lu_{1-x}Ce_xMgScSi_3O_{12}$ e.g. with x less than or equal to 0.2, e.g. x equal to 0.06 or 0.03.

In various embodiments, the silicogarnet phosphor includes cerium and lutetium as sole elements from the group of the lanthanides, that is to say elements having the atomic numbers 57 to 71.

In various embodiments, the conversion means can be embodied as an unmixed, single-phase phosphor, wherein this material property is determinable by means of x-ray powder diffraction. Any impurity that absorbs in the optical range influences the efficiency directly and negatively. Non-absorbing impurities do not directly influence the efficiency. However, they often change secondary properties, such as the scattering capability which can then have a disadvantageous effect on the conversion means.

Provision can also be made, however, for incorporating a further component in the conversion means alongside an actual phosphor which is also detectable by XRD, which further component has such a scattering effect.

In various embodiments, the excitation radiation source is designed to radiate excitation radiation with an excitation radiation surface power density of at least 1 $kW/cm^2$ onto the conversion means, and is configured in particular in such a way, if appropriate also in combination with optical elements of the light module, that the excitation radiation source radiates excitation radiation with an excitation radiation surface power density of at least 1 $kW/cm^2$ onto the conversion means during the operation of the light module. Since the effects of the conversion means having the second dominant wavelength in relation to a conversion means having a dominant wavelength that approximately corresponds to the predefinable first dominant wavelength become clearly apparent only starting from a threshold value of the excitation radiation surface power density, the provision of an excitation radiation source which radiates onto the conversion means with an excitation radiation surface power density of at least 1 $kW/cm^2$ is particularly advantageous. In various embodiments, the value of the excitation radiation surface power density is in the range of between 1-25 $kW/cm^2$, e.g. in the range of between 2-25 $kW/cm^2$. The greater the excitation radiation surface power density, the greater the increase in efficiency, too. However, since the conversion means having the shorter second dominant wavelength also attains saturation starting from a specific excitation radiation surface power density, the excitation radiation surface power density is sensibly not selectable with arbitrary magnitude. However, excitation radiation surface power densities and thus also luminous fluxes of the generated light which are significantly greater than those possible heretofore in the convetional devices are made possible by various embodiments,.

In various embodiments, a wavelength that is greater than 590 nm, e.g. greater than 600 nm, is predefined as the predefinable first dominant wavelength. The predefinable first dominant wavelength is furthermore e.g. predefined in a range of 590 nm-620 nm, e.g. in a range of 595 nm-610 nm. The first dominant wavelength is freely selectable in these examplary ranges. In principle, other wavelengths outside these ranges can also be predefined. However, for applications such as, for example, in projectors, e.g. in cinema film projectors, or entertainment applications, in which the generated red light is intended to be combined with light of other colors, it may be advantageous to select the first dominant wavelength to be not less than 590 nm since, the shorter the first dominant wavelength, the greater the restriction on the addressable color space, too. The first dominant wavelength should also be selected to be not excessively high, that is to say not significantly greater than 610-620 nm, since the maximum luminous flux that can be provided decreases as the dominant wavelength increases. This is owing to the fact that the brightness sensitivity of the eye decreases greatly starting from wavelengths of 610 nm. An effect of various embodiments, moreover, may be that the predefinable wavelength is predefinable in a continuously variable manner, that is to say that the limiting wavelength of a spectral filter can be selected such that wavelength spectra with an arbitrary first dominant wavelength can be generated. Therefore, a multiplicity of possibilities are available for predefining the first dominant wavelength arbitrarily depending on requirement, application, desired color gamut, maximum luminous flux and the like.

In various embodiments, the excitation radiation source can be embodied as a laser light source, e.g. as a semiconductor laser. However, it is also possible to use an LED, e.g. a high-power LED, as the excitation radiation source.

In various embodiments, the conversion means is arranged on a carrier arranged in a non-movable manner at least relative to the excitation radiation source. By way of example, this can involve components in which excitation radiation source and conversion means are arranged in a common housing, e.g. in an SMD chip housing (surface-mounted device). Such components may be usable for separately providing individual color channels, e.g. for projection devices having parallel, that is to say simultaneous, color generation. This may constitute a particularly simple and cost-effective configuration of various embodiments. Nevertheless, here as well, light having different colors or spectra having different dominant wavelengths can be generated by means of suitable filtering, as described above.

Furthermore, the light module may also include one or a plurality of bandpass filters in order to address e.g. the DCI color space for digital cinema applications.

In various embodiments, a projection device may include a light module according to various embodiments, thus resulting in a projection device according to various embodiments.

In various embodiments, the projection device includes a phosphor wheel, which is rotatable about a rotation axis of the phosphor wheel, wherein at least the conversion means is arranged at least in a segment of a ring-shaped region of the phosphor wheel that runs around the rotation axis of the phosphor wheel, wherein at least a second conversion means is arranged at least in a second segment of the ring-shaped region running around the rotation axis of the phosphor wheel. In this case, e.g. at least a second conversion means is arranged at least in a second segment of the region running around the rotation axis of the phosphor wheel in a ring-shaped manner. In this case, the second conversion means is embodied, for example, in such a way that it has a second emission spectrum having a third dominant wavelength that is different than the first dominant wavelength. Furthermore, the third dominant wavelength may be less than the first and second dominant wavelengths; by way of example, the third dominant wavelength is in the green spectral range. The phosphor wheel and the use of two or more different conversion means thus make it possible to generate light having different dominant wavelengths in a simple manner, which is particularly advantageous e.g. in the case of an integration of the light module into the projection device.

In various embodiments, the phosphor wheel has a through opening in at least one third segment of the region running around the rotation axis in a ring-shaped manner, wherein the projection device is configured in such a way that excitation radiation emitted by the excitation radiation source can be sequentially radiated at least indirectly during a rotation of the phosphor wheel onto each segment of the region of the phosphor wheel that runs around the rotation axis in a ring-shaped manner. In various embodiments, the through opening of the at least one third segment is embodied such that excitation radiation emitted by the excitation radiation source can be radiated through the through opening if the at least one third segment is situated in one or a plurality of predefinable rotation angle ranges during a rotation of the phosphor wheel. As a result, part of the excitation radiation can be radiated through the phosphor wheel and, given suitable deflection, for example by optical elements, such as deflection mirrors, can be combined with the light emitted by the conversion means. In this case, the excitation radiation source may be designed to emit excitation radiation in a wavelength range of 440-470 nm, e.g. in a range of 445-455 nm. Firstly, this is a suitable wavelength range for exciting customary phosphors and, secondly, this blue light is also particularly well suited to enabling, by means of combination with light having other wavelengths, such as e.g. red and green, a large color space of colors that can be provided by combination.

In various embodiments, the projection device includes a phosphor wheel, which is rotatable about a rotation axis of the phosphor wheel, wherein the conversion means is arranged as sole conversion means on the phosphor wheel. This also provides a multiplicity of configuration possibilities. By way of example, a phosphor wheel including only one phosphor may be particularly well suited to an embodiment of the light module as projector with three-chip technology or with a plurality of imagers. In this case, further phosphors can also be provided on separate carrier elements, such as further phosphor wheels or static, immobile carriers. However, a suitable embodiment and arrangement of filters also makes it possible to generate light of varying color with only one phosphor. By way of example, light in the red spectral range can be generated with the use of an orange-red phosphor in combination with the spectral filter, and light in the orange spectral range can be generated by the use of a further filter, e.g. a short-pass filter. Furthermore, the excitation radiation in the blue spectral range can also be combined partly with the light generated by the phosphor and filtered. Furthermore, the embodiment of a carrier element as a phosphor wheel is also advantageous when only one phosphor is arranged on the phosphor wheel since in this way, by virtue of the rotation of the phosphor wheel, a phosphor region is not permanently irradiated by the excitation radiation. By this means, too, the heating of the phosphor can be reduced and the conversion efficiency can thus be increased.

Furthermore, the excitation radiation source may include a plurality of laser diodes. The latter can be embodied as a laser diode array, for example, which uses laser light sources of identical type and/or of different types. Furthermore, provision can be made of additional mirrors for deflecting the light emitted by the laser diodes, by which mirrors the light can be directed via further optical elements for focusing and/or collimating the light onto the phosphor wheel, in particular during rotation of the phosphor wheel, sequentially onto each of the segments of the ring-shaped region.

In various embodiments, the projection device may include a filter wheel including at least the spectral filter, wherein the spectral filter is arranged in at least one first region of the filter wheel, wherein the filter wheel is rotatable about a rotation axis of the filter wheel in a manner corresponding to the phosphor wheel in such a way that at least one part of the light having the second dominant wavelength emitted by the conversion means can be radiated at least indirectly onto the at least one first region of the filter wheel in which the spectral filter is arranged. Furthermore, it may be provided to configure the filter wheel such that it has one or a plurality of further regions in which the spectral filter is not arranged, such that light emitted by the at least one second conversion means and/or part of the excitation radiation can be radiated onto the one or the plurality of regions of the filter wheel in which the spectral filter is not arranged, during a corresponding rotation of phosphor wheel and filter wheel, e.g. at the same angular velocity. In this case, the spectral filter can be embodied in a circle-segment-shaped fashion, for example, and can be arranged in a circle segment of the filter wheel. The spectral filter can also be arranged just in a partial region of a circle segment of the filter wheel, for example analogously to the embodiment of the phosphor wheel in a segment of a region of the filter wheel that runs around the rotation axis of the filter wheel in a ring-shaped manner. The spectral filter can also be arranged in a plurality of regions of the filter wheel or a plurality of spectral filters, e.g. embodied such that they are of identical type, can be arranged in different regions or segments of the filter wheel, e.g. if the conversion means having the second dominant wavelength is likewise arranged in a plurality of segments of the ring-shaped region of the phosphor wheel. Furthermore, the filter wheel may also include one or a plurality of filters different than the spectral filter, e.g. for filtering light emitted by the second conversion means, which is e.g. embodied as a green phosphor. By way of example, the further filter can be embodied as a short-pass filter and filter out yellow spectral components from light emitted by the green phosphor arranged on the phosphor wheel. When filtering green phosphor light, although no advantages with regard to a higher luminous flux can be achieved, a better green hue can be generated as a result, by which the color gamut that can be provided can likewise be increased and improvements with regard to the white point can be achieved. The spectral filter and/or the further filters can furthermore be applied to one side of the filter wheel as coating at least in regions. Furthermore, an antireflection coating can be applied on the other side of the filter wheel in order to enable a maximum transmission of filtered and also unfiltered light.

In various embodiments, the filter wheel includes at least one second region in which the spectral filter is not arranged, wherein the filter wheel is rotatable in a manner corresponding to the phosphor wheel in such a way that a part of the light having the second dominant wavelength emitted by the conversion means can be radiated at least indirectly onto the at least one second region of the filter wheel in which the spectral filter is not arranged. This may be provided e.g. if the conversion means is embodied as an orange-red phosphor. In this regard, part of the light emitted by the orange-red phosphor can be radiated onto the spectral filter in order to generate light in the red spectral range, and part of the light emitted by the orange-red phosphor can be radiated onto the second region of the filter wheel which has no filter and in which the orange-red light is transmitted without filtering by the filter wheel. In this regard, light in the orange spectral range and light in the red spectral range may be generated by the use of only one phosphor, namely the orange-red phosphor.

The method according to various embodiments for providing wavelength-converted light in the red spectral range having a predefinable first dominant wavelength of an output spectrum includes absorbing an excitation radiation having at least one first wavelength of an absorption spectrum, converting the absorbed excitation radiation into light having at least one second wavelength of an emission spectrum, and emitting the converted light by means of a conversion means, wherein the at least one second wavelength is greater than the at least one first wavelength, and emitting excitation radiation having a spectral component within the absorption spectrum by an excitation radiation source, wherein the excitation radiation source is arranged in such a way that excitation radiation emitted by the excitation radiation source can be radiated at least indirectly onto the conversion means. According to various embodiments, the method may further include emitting the emission spectrum having a red spectral component and having a second dominant wavelength and having a full width at half maximum of at least 120 nm, and reducing the emission spectrum having the second dominant wavelength to the output spectrum having the predefinable first dominant wavelength by means of a spectral filter having a long-pass filter characteristic and a predefinable limiting wavelength.

The substantive features mentioned for the light module according to various embodiments and its configurations in this case enable the development of the method according to various embodiments by further method processes. Furthermore, the features and feature combinations mentioned for the light module according to various embodiments and its configurations and the effects thereof apply to the method according to various embodiments in the same way.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A light module for providing wavelength-converted light in the red spectral range having a predefinable first dominant wavelength of an output spectrum, the light module comprising:
a conversion means, which is designed to absorb excitation radiation having at least one first wavelength of an absorption spectrum and to convert it into light having at least one second wavelength of an emission spectrum and to emit the latter, wherein the at least one second wavelength is greater than the at least one first wavelength;

an excitation radiation source which is designed to emit excitation radiation having a spectral component within the absorption spectrum, wherein the excitation radiation source is arranged in such a way that excitation radiation emitted by the excitation radiation source can be radiated at least indirectly onto the conversion means; and a spectral filter having a long-pass filter characteristic and having a predefinable limiting wavelength and wherein the spectral filter is designed and arranged in such a way as to reduce the emission spectrum having the second dominant wavelength to the output spectrum having the predefinable first dominant wavelength;

wherein the conversion means has an emission spectrum having a red spectral component and having a second dominant wavelength and having a full width at half maximum of at least 120 nm.

2. The light module of claim 1, wherein the second dominant wavelength is in an orange-red spectral range.

3. The light module of claim 2, wherein the second dominant wavelength is in an orange-red spectral range between 575 nm and 600 nm.

4. The light module of claim 3, wherein the second dominant wavelength is in an orange-red spectral range between 580 nm and 595 nm.

5. The light module of claim 1, wherein the conversion means is embodied as a silicogarnet phosphor having a cerium doping.

6. The light module of claim 1, wherein the silicogarnet phosphor comprises cerium and lutetium as sole elements from the group of the lanthanides, that is to say elements having the atomic numbers 57 to 71.

7. The light module of claim 1, wherein the conversion means is embodied as an unmixed, single-phase phosphor, wherein this material property is determinable by means of x-ray powder diffraction.

8. The light module of claim 1, wherein the excitation radiation source is designed to radiate excitation radiation with an excitation radiation surface power density of at least 1 kW/cm$^2$ onto the conversion means.

9. The light module of claim 8, wherein the excitation radiation source is configured to radiate excitation radiation with an excitation radiation surface power density of at least 1 kW/cm$^2$ onto the conversion means during the operation of the light module.

10. The light module of claim 1, wherein the excitation radiation source is embodied as a laser light source.

11. The light module of claim 10, wherein the excitation radiation source is embodied as a semiconductor laser.

12. The light module of claim 1, wherein the conversion means is arranged on a carrier arranged in a non-movable manner at least relative to the excitation radiation source.

13. A projection device, comprising:
a light module for providing wavelength-converted light in the red spectral range having a predefinable first dominant wavelength of an output spectrum, the light module comprising:
  a conversion means, which is designed to absorb excitation radiation having at least one first wavelength of an absorption spectrum and to convert it into light having at least one second wavelength of an emission spectrum and to emit the latter, wherein the at least one second wavelength is greater than the at least one first wavelength;
  an excitation radiation source which is designed to emit excitation radiation having a spectral component within the absorption spectrum, wherein the excitation radiation source is arranged in such a way that excitation radiation emitted by the excitation radiation source can be radiated at least indirectly onto the conversion means; and
  a spectral filter having a long-pass filter characteristic and having a predefinable limiting wavelength and wherein the spectral filter is designed and arranged in such a way as to reduce the emission spectrum having the second dominant wavelength to the output spectrum having the predefinable first dominant wavelength;
  wherein the conversion means has an emission spectrum having a red spectral component and having a second dominant wavelength and having a full width at half maximum of at least 120 nm.

14. The projection device of claim 13, further comprising:
a phosphor wheel, which is rotatable about a rotation axis of the phosphor wheel;
wherein at least the conversion means is arranged at least in a segment of a ring-shaped region of the phosphor wheel that runs around the rotation axis of the phosphor wheel;
wherein at least a second conversion means is arranged at least in a second segment of the region running around the rotation axis of the phosphor wheel in a ring-shaped manner.

15. The projection device of claim 14, wherein the phosphor wheel has a through opening in at least one third segment of the region running around the rotation axis in a ring-shaped manner;
wherein the projection device is configured in such a way that excitation radiation emitted by the excitation radiation source can be sequentially radiated at least indirectly during a rotation of the phosphor wheel onto each segment of the region of the phosphor wheel that runs around the rotation axis in a ring-shaped manner.

16. The projection device of claim 13, further comprising:
a phosphor wheel, which is rotatable about a rotation axis of the phosphor wheel;
wherein the conversion means is arranged as sole conversion means on the phosphor wheel.

17. The projection device of claim 14, further comprising:
a filter wheel comprising at least the spectral filter;
wherein the spectral filter is arranged in at least one first region of the filter wheel;
wherein the filter wheel is rotatable about a rotation axis of the filter wheel in a manner corresponding to the phosphor wheel in such a way that at least one part of the light having the second dominant wavelength emitted by the conversion means can be radiated at least indirectly onto the at least one first region of the filter wheel in which the spectral filter is arranged.

18. The projection device of claim 15,
wherein the filter wheel comprises at least one second region in which the spectral filter is not arranged;
wherein the filter wheel is rotatable in a manner corresponding to the phosphor wheel in such a way that a part of the light having the second dominant wavelength emitted by the conversion means can be radiated at least indirectly onto the at least one second region of the filter wheel in which the spectral filter is not arranged.

19. A method for providing wavelength-converted light in the red spectral range having a predefinable first dominant wavelength of an output spectrum comprising:
absorbing an excitation radiation having at least one first wavelength of an absorption spectrum, converting the absorbed excitation radiation into light having at least one second wavelength of an emission spectrum, and emitting the converted light by means of a conversion means, wherein the at least one second wavelength is greater than the at least one first wavelength; and
emitting excitation radiation having a spectral component within the absorption spectrum by means of an excitation radiation source, wherein the excitation radiation source is arranged in such a way that excitation radiation emitted by the excitation radiation source can be radiated at least indirectly onto the conversion means;
emitting the emission spectrum having a red spectral component and having a second dominant wavelength and having a full width at half maximum of at least 120 nm; and
reducing the emission spectrum having the second dominant wavelength to the output spectrum having the predefinable first dominant wavelength by means of a spectral filter having a long-pass filter characteristic and a predefinable limiting wavelength.

* * * * *